United States Patent
Barlesi et al.

(10) Patent No.: US 7,845,224 B2
(45) Date of Patent: Dec. 7, 2010

(54) LIQUID LEVEL SENSOR AND LIQUID LEVEL ESTIMATION METHOD

(75) Inventors: Lorenzo Barlesi, Paris (FR); Michel Chiaffi, Breuil le Vert (FR); Volodia Naydenov, Louvain-la-Neuve (BE)

(73) Assignee: Inergy Automotive Systems Research (Societe Anonyme), Brussels (BE)

(*) Notice: Subject to any disclaimer, the term of this patent is extended or adjusted under 35 U.S.C. 154(b) by 523 days.

(21) Appl. No.: 11/793,542

(22) PCT Filed: Dec. 20, 2005

(86) PCT No.: PCT/EP2005/056968

§ 371 (c)(1),
(2), (4) Date: Apr. 18, 2008

(87) PCT Pub. No.: WO2006/067149

PCT Pub. Date: Jun. 29, 2006

(65) Prior Publication Data

US 2009/0120159 A1    May 14, 2009

(30) Foreign Application Priority Data

Dec. 22, 2004 (EP) .................................. 04106868

(51) Int. Cl.
G01F 23/26 (2006.01)
G01R 27/26 (2006.01)

(52) U.S. Cl. ................. 73/304 C; 73/290 R; 73/304 R; 73/313; 324/658; 324/663; 324/686

(58) Field of Classification Search ............... 73/290 B, 73/290 R, 304 R, 304 C, 313; 324/658, 663, 324/669, 678, 686

See application file for complete search history.

(56) References Cited

U.S. PATENT DOCUMENTS

| 3,801,902 | A |   | 4/1974  | Horowitz         |         |
|-----------|---|---|---------|------------------|---------|
| 4,149,213 | A |   | 4/1979  | Flemons          |         |
| 4,199,984 | A | * | 4/1980  | Huddart et al.   | 73/304 C |
| 4,214,479 | A |   | 7/1980  | Maier            |         |
| 4,259,865 | A | * | 4/1981  | Myers            | 73/304 C |
| 4,388,828 | A | * | 6/1983  | Dougherty        | 73/304 C |
| 4,444,051 | A |   | 4/1984  | Yamaki et al.    |         |
| 4,545,020 | A | * | 10/1985 | Brasfield        | 702/52  |
| 4,679,433 | A | * | 7/1987  | Clinton et al.   | 73/304 C |
| 4,748,401 | A | * | 5/1988  | Aldinger         | 324/658 |

(Continued)

FOREIGN PATENT DOCUMENTS

DE  42 37 196  2/1994

(Continued)

*Primary Examiner*—David A. Rogers
(74) *Attorney, Agent, or Firm*—Oblon, Spivak, McClelland, Maier & Neustadt, L.L.P.

(57) ABSTRACT

A sensor for detecting a liquid level, including a measurement capacitor, a reference capacitor, an integrating capacitor, a calibration capacitor, a controller, an amplifier, a comparator, and a complementary calibration capacitor. The controller implements operations, over accumulation periods and for given target and discharge capacitors, of a target capacitor charging, a charge transfer, a decision, a conditional discharge, and a return. The target and discharge capacitors given at each period are taken from pairs of capacitors, including the measurement and calibration capacitors and the reference and complementary calibration capacitors. A method estimates the liquid level using the sensor in a vehicle.

11 Claims, 5 Drawing Sheets

U.S. PATENT DOCUMENTS

| | | |
|---|---|---|
| 4,947,689 A | 8/1990 | Hochstein |
| 5,042,299 A | 8/1991 | Wells |
| 5,175,505 A | 12/1992 | Magenau et al. |
| 5,451,940 A | 9/1995 | Schneider et al. |
| 5,576,628 A * | 11/1996 | Caliboso et al. ............. 324/678 |
| 5,600,254 A * | 2/1997 | Berberich .................. 324/711 |
| 5,652,392 A * | 7/1997 | Lawson ...................... 73/753 |
| 5,659,254 A | 8/1997 | Matsumoto et al. |
| 5,661,240 A | 8/1997 | Kemp |
| 6,502,460 B1 * | 1/2003 | Lin et al. .................. 73/304 C |
| 6,781,388 B2 * | 8/2004 | Wang et al. ................. 324/690 |
| 7,084,644 B2 * | 8/2006 | Haider ....................... 324/664 |
| 2005/0218913 A1 * | 10/2005 | Inaba et al. ................. 324/678 |

FOREIGN PATENT DOCUMENTS

| | | |
|---|---|---|
| DE | 43 40 472 | 4/1995 |
| EP | 0 644 432 | 3/1995 |
| FR | 2 447 555 | 8/1980 |
| GB | 2 058 364 | 4/1981 |
| SU | 1 767 451 | 10/1992 |
| WO | 98 57132 | 12/1998 |
| WO | 99 10714 | 3/1999 |
| WO | 99 67604 | 12/1999 |
| WO | 01 02817 | 1/2001 |
| WO | 01 79789 | 10/2001 |

* cited by examiner

LIQUID LEVEL SENSOR AND LIQUID LEVEL ESTIMATION METHOD

FIELD OF THE INVENTION

The invention relates to a capacitive sensor for detecting the level of a liquid in a tank, including a measurement capacitor intended to be placed in the tank; a reference capacitor intended to be placed in the tank in a bottom part of the latter; a calibration capacitor having a capacitance higher than that of the measurement capacitor; control means capable of delivering an estimation signal corresponding to the level of the liquid; an operational amplifier; an integrating capacitor connected between the inverting input of the amplifier and its output; and a comparator intended for comparing the output voltage of the amplifier with a threshold voltage and to deliver a comparison signal to the control means.

The invention also relates to a method of estimating the level of a liquid in a tank by a capacitive measurement and to the use of such a capacitive level sensor for a tank in a vehicle.

PRIOR ART

Such sensors are known in the prior art.

French Patent Application FR 2 795 816 A1 for example discloses such a sensor. This application discloses a level detector for detecting the level of a liquid in a tank, which comprises a measurement capacitor intended to be placed over the entire height of the tank and designed so that its capacitance varies with the level of the liquid in the tank and a reference capacitor intended to be placed at the bottom of the tank.

Furthermore, the capacitors are connected to an interpreting electronic circuit, which comprises a microcontroller incorporating software means for periodically charging, in discrete amounts, an integrator from a capacitance to be measured, and then for discharging this integrator from a calibration capacitor placed in the circuit, the capacitance of the calibration capacitor being higher than all the capacitances to be measured. A comparator is used to compare the amount of charge from the integrator with a threshold value and to transmit, as soon as the threshold value is violated, a signal to the microcontroller. This entails removing an amount of electricity from the integrator via the calibration capacitor in such a way that the average charge of the integrator remains virtually constant. The number of times the comparator is at "1" over a given period allows the level of the liquid in the tank to be estimated.

Although such sensors of the prior art can operate well, it has been observed that they do not provide sufficient precision for some applications, especially when the measurement capacitor and the reference capacitor have greatly different capacitances or when it is necessary to estimate capacitances that are very small compared with the parasitic capacitances, which may for example be the case when the dimensions of the sensor are small or when the permittivity of the liquid is low compared with that of water at ambient temperature.

SUMMARY OF THE INVENTION

It is an object of the invention to alleviate the problems of the prior art, and in particular to make it possible to obtain more precise measurements, particularly for applications in which the measurement capacitor and the reference capacitor have greatly different capacitances.

For this purpose, the sensor according to the invention is characterized in that it further includes a complementary calibration capacitor having a capacitance higher than that of the reference capacitor and different from that of the calibration capacitor, in that the control means are intended to implement, over successive accumulation periods and for a target capacitor and a discharge capacitor that are given for each period, the following steps: a first step, for charging the target capacitor by applying a given voltage to its terminals; a second step, for transferring the charge from the target capacitor to the integrating capacitor; a third step, for deciding to skip the fourth step if the comparison signal is negative; a fourth step, for discharging some of the charge of the integrating capacitor into the discharge capacitor and then for completely discharging the discharge capacitor; and a fifth step, for returning to the first step, and in that the target and discharge capacitors given at each period are taken respectively from a group of pairs of capacitors, including the measurement capacitor and the calibration capacitor, and the reference capacitor and the complementary calibration capacitor.

In operation, and more particularly during a given accumulation period, the charge stored in the integrating capacitor of the sensor according to the invention varies with the successive steps carried out by the control means, so that this charge reaches a given charge value, corresponding to an output voltage greater than or equal to the threshold voltage, and corresponding to a positive comparison signal, a number of times. This number is substantially proportional to the ratio of the average capacitance of the target capacitor over the given accumulation period to the capacitance of the discharge capacitor, of known and substantially constant value. This number thus makes it possible for the control means to estimate the average capacitance of the target capacitor over the given accumulation period.

The target capacitor may be the measurement capacitor for a certain number of successive accumulation periods, in order thereafter to be the reference capacitor for a following accumulation period. As regards the discharge capacitor of the sensor according to the invention, unlike the sensors of the prior art, this is not, irrespectively, the same calibration capacitor, whether the target capacitor is the measurement capacitor or whether it is the reference capacitor. The target and discharge capacitors given at each accumulation period are taken respectively from a group of pairs of capacitors, including the measurement capacitor and the calibration capacitor, and the reference capacitor and the complementary calibration capacitor. In other words, when the capacitance of the measurement capacitor is being estimated, the calibration capacitor is used as discharge capacitor, whereas when the capacitance of the reference capacitor is being estimated, the complementary calibration capacitor is used as discharge capacitor.

It has been observed that this association of a specific discharge capacitor with the target capacitor, that is to say the association of the calibration capacitor with the measurement capacitor and the association of the complementary calibration capacitor with the reference capacitor, makes it possible to obtain more precise estimations. This is because, under normal operating conditions, the calibration capacitor has a capacitance higher than that of the measurement capacitor and the complementary calibration capacitor has a capacitance higher than that of the reference capacitor, but different from that of the calibration capacitor. The capacitance of the complementary calibration capacitor is for example lower or much lower than the capacitance of the calibration capacitor.

The association of a given target capacitor with a specific discharge capacitor makes it possible, whatever the pair in question, to obtain over a given accumulation period, a large enough charging-induced threshold violation factor and, in this case, finer capacitance ratios and greater measurement precision have been observed. The threshold violation factor is the ratio of the number of threshold violation events to the total number of charging events for a given accumulation period, which ratio is substantially equal to the ratio of the target capacitance to the discharge capacitance.

In other words, it has been observed that the closer the value of the target capacitor to the value of the reference capacitor, while still always being higher than the latter, the more precise the measurement.

The sensor according to the invention has an additional advantage in that it allows greater freedom in the choice of types of measurement and reference capacitor when designing the sensor itself. The calibration of the measurements, adapted to the value to be measured, allows greater precision to be obtained in the results and greater freedom in the design.

Another object of the invention is to reduce the parasitic effects of temperature variations due to the materials of the support for the capacitors.

For this purpose, according to one particular embodiment, the sensor according to the invention further includes a first compensating capacitor, the characteristics of which vary with temperature substantially in the same way as the materials of the support for the measurement and reference capacitors, and in which the group of pairs of capacitors further includes the first compensating capacitor and the complementary calibration capacitor.

The addition of a first compensating capacitor and its pairing with the complementary calibration capacitor make it possible to measure the variations in the properties of the dielectric of the compensating capacitor, which correspond to the variations with time of the materials of the support for the measurement and reference capacitors. Thus, the control means can take into account these variations in order to deliver the estimation signal.

In other words, the first compensating capacitor, owing to its composition and its shape, is intended to imitate the change in the influence of the dielectric components of the materials of the support for the measurement and reference capacitors, in order to compensate for this influence. Again, in other words, the objective is to use a more refined model of the reality, providing more precise estimations, but adding to the system an unknown, namely the dielectric constant of materials of the support, and the solution proposed by the invention is to add, to the system, an equation resulting from the mathematical expression of the capacitance of the first compensating capacitor, which is a function of the dielectric constant of the materials of the support.

Although this solution for improving the precision of the estimation signal, by mimicry, may seem at first sight to be tedious and complex, the sensor according to the invention and the steps carried out by the control means during successive accumulation periods are such that the addition of a capacitance of a capacitor to be measured adds very little to the complexity to the sensor and to the implementation of its control means, thanks to the flexible nature of the design of the sensor.

Merely for the purpose of making the sensor according to the invention clearly understood in comparison with the systems of the prior art, it should be noted that International Application WO 01/79789 A2 discloses a level measurement system comprising a measurement circuit that can be used in combination with a capacitive probe to measure the level of a material in a tank. The capacitive probe comprises a probe capacitor and a reference capacitor used to calibrate the particular material used. The imprecision problems caused by parasitic capacitances, especially between the probe capacitor and the reference capacitor, which may vary, for example as a consequence of temperature variations, are actively compensated for by the circuit of the system in question. This circuit comprises a current source and switches for delivering a constant current to the measurement capacitor so as to keep the voltage across the terminals of the reference capacitor at the same level as the voltage across the terminals of the measurement capacitor. This eliminates the parasitic capacitances by eliminating the voltage difference across the terminals of the conductors between which this parasitic capacitance is likely to appear.

Again in the system of the prior art, disclosed in the above-mentioned international application, once the measurement voltage is equal to 2 volts, the time to reach this voltage is used to estimate the capacitance of the measurement capacitor.

This is not the approach of the level sensor according to the invention. The level sensor according to the invention operates differently, according to one of its embodiments, by the addition of a first compensating capacitor which, in a certain way, and as explained above, imitates the variations due to the support in order to incorporate them into the calculation. This makes it possible for a sensor architecture to be of relatively simple design. The control and calibration operations are also reduced.

Another object of the invention is to reduce the parasitic effects of the temperature variations due to the materials of the protective layers of the capacitors.

For this purpose, according to one particular embodiment, the sensor according to the invention further includes a second compensating capacitor, the characteristics of which vary with temperature substantially in the same manner as the materials of the protective layers of the measurement and reference capacitors, respectively, and in which the group of pairs of capacitors further includes the second compensating capacitor and the complementary calibration capacitor.

This particular embodiment of the invention makes it possible to compensate for the parasitic capacitance due to the materials of the protective layers and in particular to compensate for and to take into account the effects of the variation of said protective layers as a function of temperature.

This is for example applicable if the probe is a printed circuit with tracks in the form of imbricated combs to which an insulating layer is added, for example a lacquer, preventing short-circuits.

The necessary equations allowing the control means to deliver the estimation signal may be found by detailing the equivalent circuits of the various capacitors, as illustrated and explained later as merely one example, and by integrating the solutions of the resulting equations into the control means.

The invention also relates to a sensor in which the first compensating capacitor and the second compensating capacitor are combined, in order to improve the precision by taking into account the influence both of the materials of the support and those of the protective layers.

The invention also relates to a method of estimating the level of a liquid in a tank by a capacitive measurement, which includes the implementation, over successive accumulation periods and for a target capacitor and a discharge capacitor that are given for each step, the following steps: a first step, for charging the target capacitor by applying a given voltage to its terminals; a second step, for transferring the charge from the target capacitor to an integrating capacitor, connected between the inverting input of an operational amplifier and its output; a third step, for deciding to skip the fourth step if a comparison signal is negative, the comparison signal being delivered by a comparator intended to compare the output voltage of the amplifier with a threshold voltage; a fourth step, for discharging some of the charge of the integrating capacitor into the discharge capacitor and then for completely discharging the discharge capacitor; and a fifth step, for returning to the first step, the target and discharge capacitors given at each period being taken respectively from a group of pairs of capacitors, including a measurement capacitor intended to be placed in the tank, and a calibration capacitor having a capacitance higher than that of the measurement capacitor, and a reference capacitor intended to be placed in the tank in a bottom part of the latter, and the complementary calibration capacitor having a capacitance higher than that of the reference capacitor and different from that of the calibration capacitor.

This method provides a more precise estimation of the liquid level in the tank, while still being inexpensive and flexible to implement.

The invention also relates to the use of a sensor as described above in a tank of a vehicle, for example a fuel tank of a motor vehicle. The sensor according to the invention is particularly well suited in the field of application in which cost and precision constraints are very important.

BRIEF DESCRIPTION OF THE DRAWINGS

These, and other, aspects of the invention will be clarified in the detailed description of particular embodiments of the invention, with reference to the drawings of the figures, in which.

The figures have not been drawn to scale. In general, similar elements are denoted by similar references in the figures.

DETAILED DESCRIPTION OF PARTICULAR EMBODIMENTS

Figure 1:
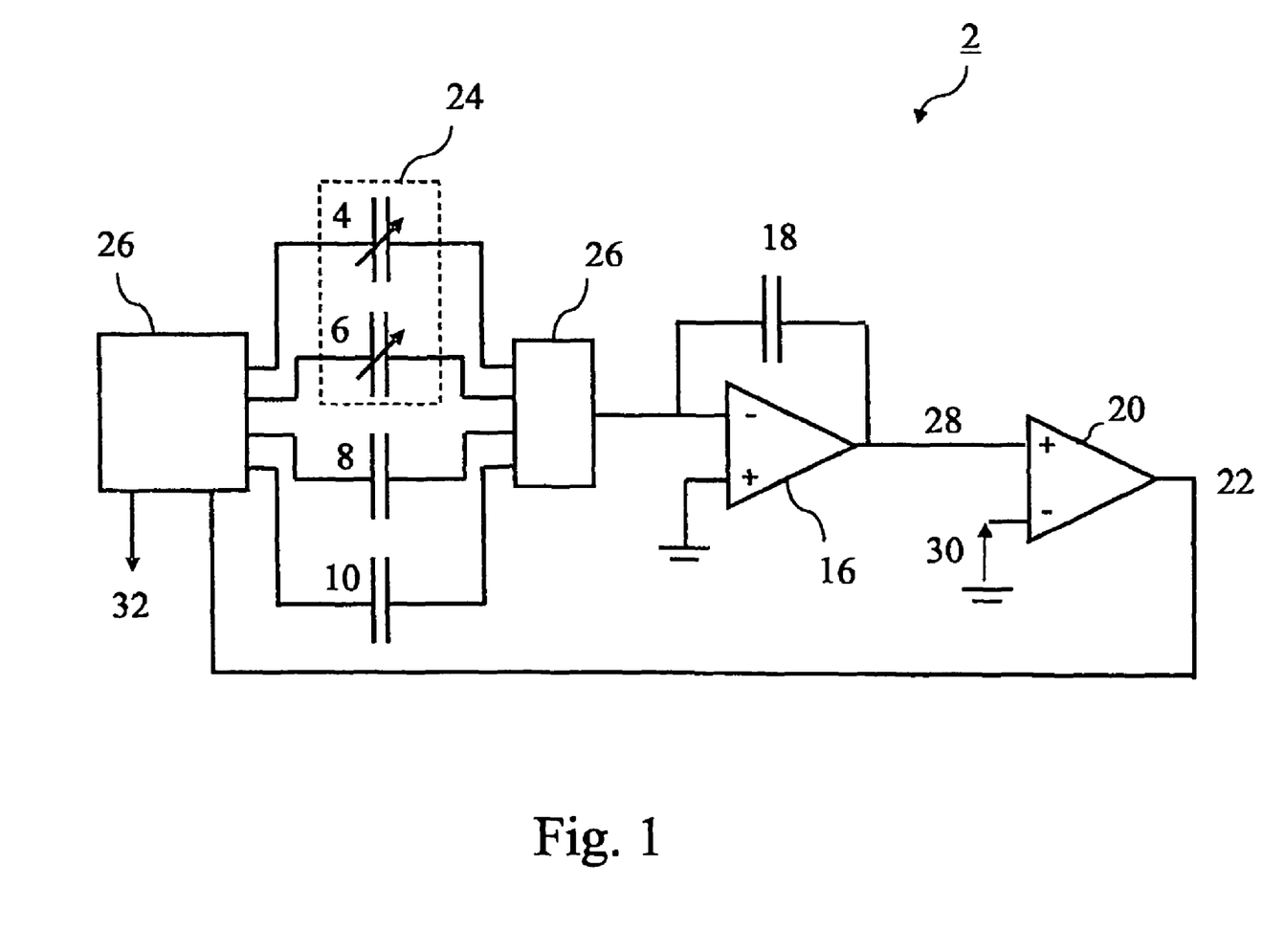
FIG. 1 shows a schematic view of one particular embodiment of the sensor according to the invention.

FIG. 1 shows a schematic view of one particular embodiment of the sensor according to the invention. The measurement capacitor 4, intended to be placed in the tank 24, and shown in the latter, is connected via its terminals to the control means 26. The reference capacitor 6 intended to be placed in a bottom part of the tank 24, and needed to compensate for the variations in the dielectric constant of the liquid, is also connected via its terminals to the control means 26. The calibration capacitor 8 and the complementary calibration capacitor 10 are placed outside or inside the tank 24, for example on an electronic circuit, which may be called an "interpreting electronic circuit", and are connected via their respective terminals to the control means 26.

The capacitance of the measurement capacitor 4 varies mainly as a function of the level of the liquid in the tank 24, that is to say its fill level, but also as a function of the dielectric constant of the liquid in question. The capacitance of the reference capacitor 6 varies mainly as a function of the dielectric constant of the liquid in question. In operation, the reference capacitor 6 is preferably intended to be permanently immersed in the liquid. The capacitances of the calibration capacitor 8 and of the complementary calibration capacitor 10 are not intended to vary with the level 44 of the liquid or with its dielectric constant. These capacitances are intended to remain generally constant, whatever the changes in level 44 or temperature in the tank 24.

The operational amplifier 16 is connected at its inverting terminal to the control means 26 and at its non-inverting terminal to a given voltage in operation, for example connected to earth. It delivers an output voltage 28. The integrating capacitor 18 is connected between the non-inverting terminal and the output of the operational amplifier 16.

The output voltage 28 or output signal is delivered to the non-inverting terminal of the comparator 20. In operation, a threshold voltage 30 is applied to the inverting terminal of the comparator 20 in such a way that the comparison signal 22 is positive, or equal to 1 for example, if the output voltage 28 is above the threshold voltage 30 and negative, or equal to 0 for example, in the opposite case.

The comparison signal 22 is delivered, via a connection shown in the lower part of FIG. 1, to the control means 26, which deliver in turn an estimation signal 32 representative of the level 44 of the liquid in the tank 24.

Figure 4:
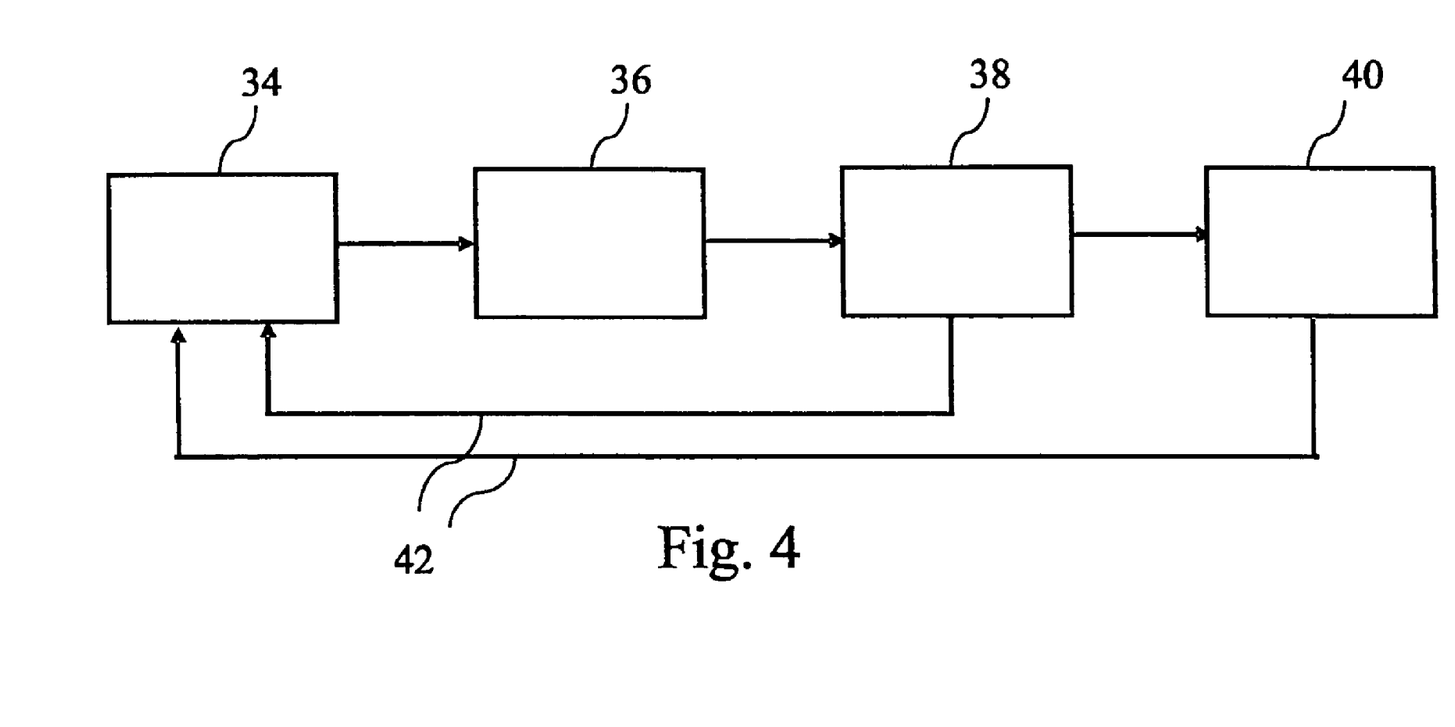
FIG. 4 shows a schematic view of the steps carried out, over a given accumulation period, by the control means of one particular embodiment of the sensor according to the invention.

In operation, and with reference both to FIG. 1 and FIG. 4, the sensor 2 according to one particular embodiment of the invention operates in the following manner. Accumulation periods follow one after another. It should be noted that these could of course be called by other names, for example estimation periods or measurement periods for estimating or measuring a capacitance without departing from the scope of the invention. The object of each period is to estimate the capacitance of a variable capacitor, that is to say, according to one particular embodiment, either the measurement capacitor 4 or the reference capacitor 6.

For example, a certain number p of accumulation periods associated with the measurement capacitor 4 may advantageously follow one after another before an accumulation period associated with the reference capacitor 6 takes place, after which the cycle can be repeated. This mode of operation is suitable for cases in which the level 44 of the liquid in the tank 24 varies more rapidly than its dielectric properties.

Always associated with a given accumulation period, which may for example last 600 milliseconds, is what is called a "target" capacitor (either the measurement capacitor 4 or the reference capacitor 6) and what is called a "discharge" capacitor (either the calibration capacitor 8 or the complementary calibration capacitor 10, respectively). The capacitor couples or pairs are specific and adapted from the point of view of the value of the capacitances to be measured, thereby making it possible to obtain a more precise estimation of the liquid level 44. A calibration capacitor 8 and a complementary calibration capacitor 10, which are different, are chosen because of the large difference between the expected capacitance range of the measurement capacitor 4 and the expected capacitance range of the reference capacitor 6.

During an accumulation period, the control means 26 are clocked by a clock and carry out the following steps. The target capacitor 4, 6 is, in a first step 34, electrically charged by applying a specified voltage to its terminals. Next, in a second step 36, the charge is transferred from the target capacitor to the integrating capacitor 18. This may for example be carried out by a system of switched-capacitor switches. In a third step 38, the comparison signal 22 is examined by the control means 26. If the signal is positive, a fourth step 40 is carried out, consisting, thanks to the discharge capacitor 8, 10, in partially discharging the integrating capacitor 18 into said discharge capacitor and, subsequently, completely discharging the discharge capacitor 8, 10. The first step 34 and the following steps are then carried out in order once again, this return to the first step 34 constituting the fifth step 42. If the comparison signal 22 is negative, the first step 34 and the following steps are carried out directly once again—in other words, the fourth step 40 is skipped and the fifth step 42, for return, is carried out directly.

The number of threshold violation events $n_{threshold}$, corresponding to the number of times the comparison signal 22 becomes positive over a given accumulation period, is substantially equal to the ratio of the capacitance of the target capacitor $C_{target}$ to the capacitance of the discharge capacitor $C_{discharge}$ multiplied by the number of charging events $n_{total}$ of the integrating capacitor 18. The corresponding equation is:

$$n_{threshold} = \frac{C_{target}}{C_{discharge}} \times n_{total}.$$

More specifically, by respectively replacing the capacitance of the target capacitor with the capacitance $C_{measurement}$ of the measurement capacitor 4 and then with the capacitance $C_{reference}$ of the reference capacitor 6, and the capacitance of the discharge capacitor with the capacitance $C_{calibration,8}$ of the calibration capacitor 8 and then with the capacitance $C_{calibration,10}$ of the complementary calibration capacitor 10, the following equations are obtained:

$$n_{threshold,measurement} = \frac{C_{measurement}}{C_{calibration,8}} \times n_{total},$$

$$n_{threshold,reference} = \frac{C_{reference}}{C_{calibration,10}} \times n_{total}.$$

Furthermore, the number of "empty" threshold violation events $n_{threshold,measurement,empty}$, that is to say when the liquid level 44 in the tank 24 is below the lower limit of the measurement capacitor 4, the latter then being influenced only by the gas above the liquid, is expressed in the same way. Thus:

$$n_{threshold,measurement,empty} = \frac{C_{measurement,empty}}{C_{calibration,8}} \times n_{total}.$$

As the relative level h of the liquid in the tank 24 is given substantially by the following expression:

$$h = k \times \frac{C_{measurement} - C_{measurement,empty}}{C_{calibration,8}} \text{ then:}$$

$$h = k \times \frac{n_{threshold,measurement} - n_{threshold,measurement,empty}}{n_{total}}.$$

The factor k represents the factor taking into account the variations in the dielectric properties of the measurement capacitor 4 (variations to the composition of the liquid, for example a fuel, or due to temperature), i.e. mainly the variations in the dielectric constant of the liquid, the level 44 of which is measured, this level being compensated for by the estimation of the capacitance of the reference capacitor 6. Finally, h is given by:

$$h = \frac{n_{threshold,reference,empty}}{n_{threshold,measurement,empty}} \times \frac{n_{threshold,measurement} - n_{threshold,measurement,empty}}{n_{threshold,reference} - n_{threshold,reference,empty}}$$

where the numbers of "empty" threshold violation events are estimated before the tank 24 is filled, and then stored by for example the control means 26.

The control means 26 may for example be implemented with switched-capacitor switches with non-overlapping clocks in order to prevent any short-circuits or other undesirable effects. The control means 26 manage and implement in particular both the level estimation calculations and the charge transfers during an accumulation period.

The measurement 4 and reference 6 capacitors may for example be physically pairs of parallel flat plates, coaxial tubes or imbricated combs on a flat substrate or printed circuit.

It should also be noted that, between two accumulation periods, whether a measurement on a given "target/discharge" capacitor pair is followed by a measurement on the same pair or by a measurement on another pair, the integrating capacitor 18 may or may not be discharged during the interval between the two accumulation periods.

The estimation signal 32 may be used for example to indicate or display the level 44 of the liquid in the tank 24 or to control, directly or indirectly, a solenoid valve for filling the tank 24, or any other actuator, for example for the purpose of ensuring safety, especially if the tank 24 is intended to be a fuel tank 24 on a vehicle.

According to one embodiment of the sensor 2 according to the invention, the influence of other dielectrics is taken into account in order to deliver the estimation signal 32. These other dielectrics may especially be specific to the architecture of that part of the sensor 2 which is intended to be in contact with the liquid in the tank 24, that is to say specific to the relative arrangement of the measurement 4 and reference 6 capacitors and to their physical design.

Two more particular embodiments are described below with reference to FIGS. 2 and 3 respectively. These are then followed by a non-limiting explanation of the reasons why the control means 26 are capable of delivering an estimation signal 32 on this basis and an explanation of the way in which said means can accomplish this.

Figure 2:
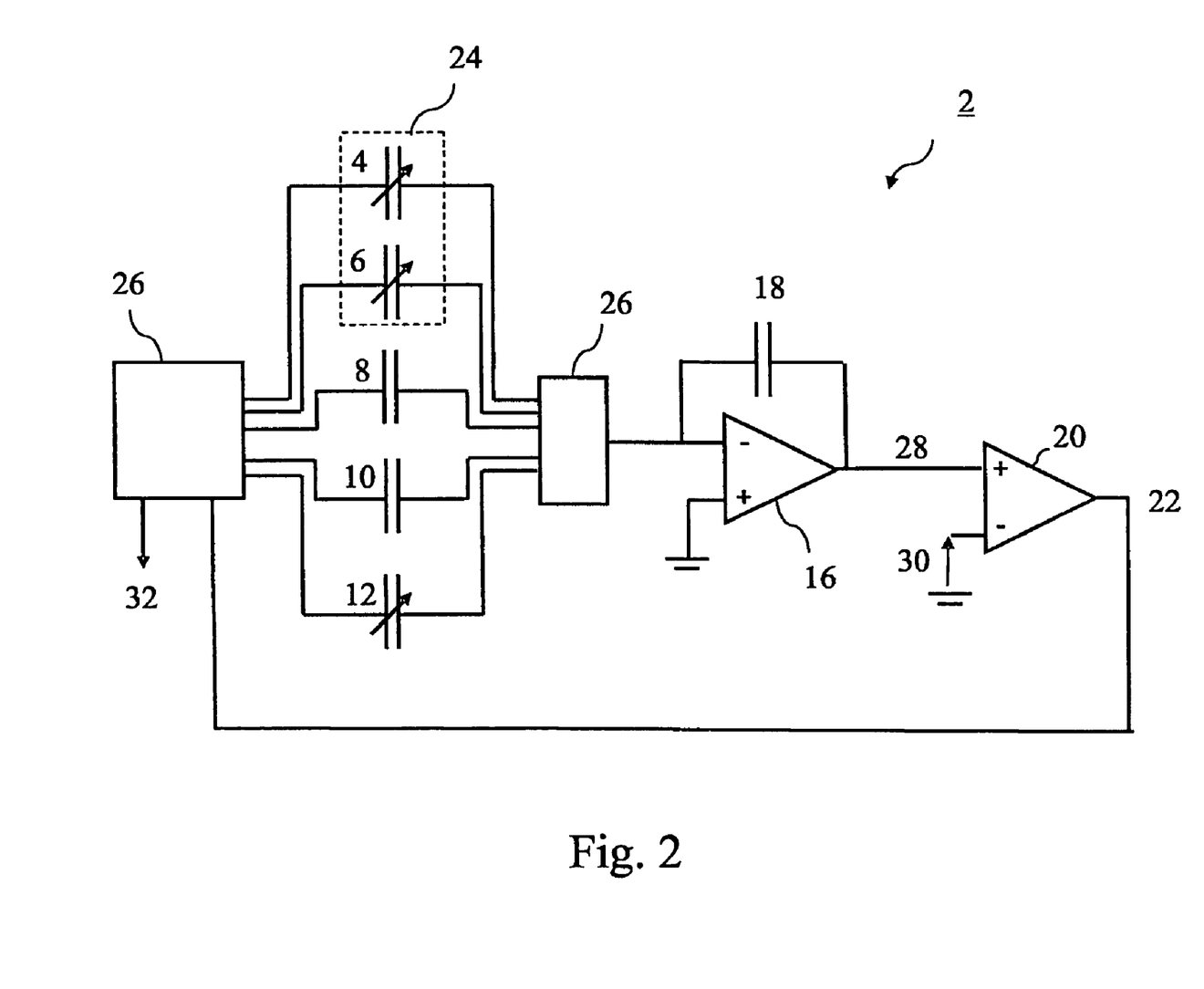
FIGS. 2 and 3 show schematic views of other particular embodiments of the sensor according to the invention.

FIG. 2 shows a schematic view of one particular embodiment of the sensor 2 according to the invention, in which the influence of other dielectrics is taken into account by the control means 26 in order to deliver the estimation signal 32. More precisely, it is the influence of the variations as a function of temperature of the dielectric constant of materials of the support for the measurement 4 and reference 6 capacitors that is taken into account.

The term "materials of the support" should be understood to mean, for example, in the case of measurement 4 and reference 6 capacitors implemented by two parallel flat plates, the spacers and other support elements for keeping the plates parallel to each other at a substantially constant distance apart, in the case of an implementation by coaxial tubes, the support elements separating the two coaxial electrodes and, in the case of implementation by imbricated combs placed on a dielectric substrate, the substrate itself.

A first compensating capacitor 12 is shown in FIG. 2. It is placed in the environment of the tank 24, that is to say in the tank or close to it, or else under environmental conditions similar or identical thereto, and is connected via its terminals to the control means 26. The properties of the dielectric of the first compensating capacitor 12 change with temperature, and possibly with other factors, substantially in the same way as the materials of the support for the measurement 4 and reference 6 capacitors, so as to imitate their change and allow them to be taken into account and compensated for by the control means 26 in order to deliver the estimation signal 32.

The capacitance of the first compensating capacitor 12 is estimated periodically during a given accumulation period by association with a discharge capacitor, for example a complementary calibration capacitor 10. This capacitance is used by the control means 26 to deliver the estimation signal 32.

According to this particular embodiment, the influence of the variations in the dielectric constant of the insulator forming the support, which is for example made of a reinforced or unreinforced thermosetting resin, or a thermoplastic resin, may for example be taken into account. This is because the dielectric constant of such a material varies substantially, in particular with temperature, and could, without this compensation, introduce an error into the estimation.

Figure 3:
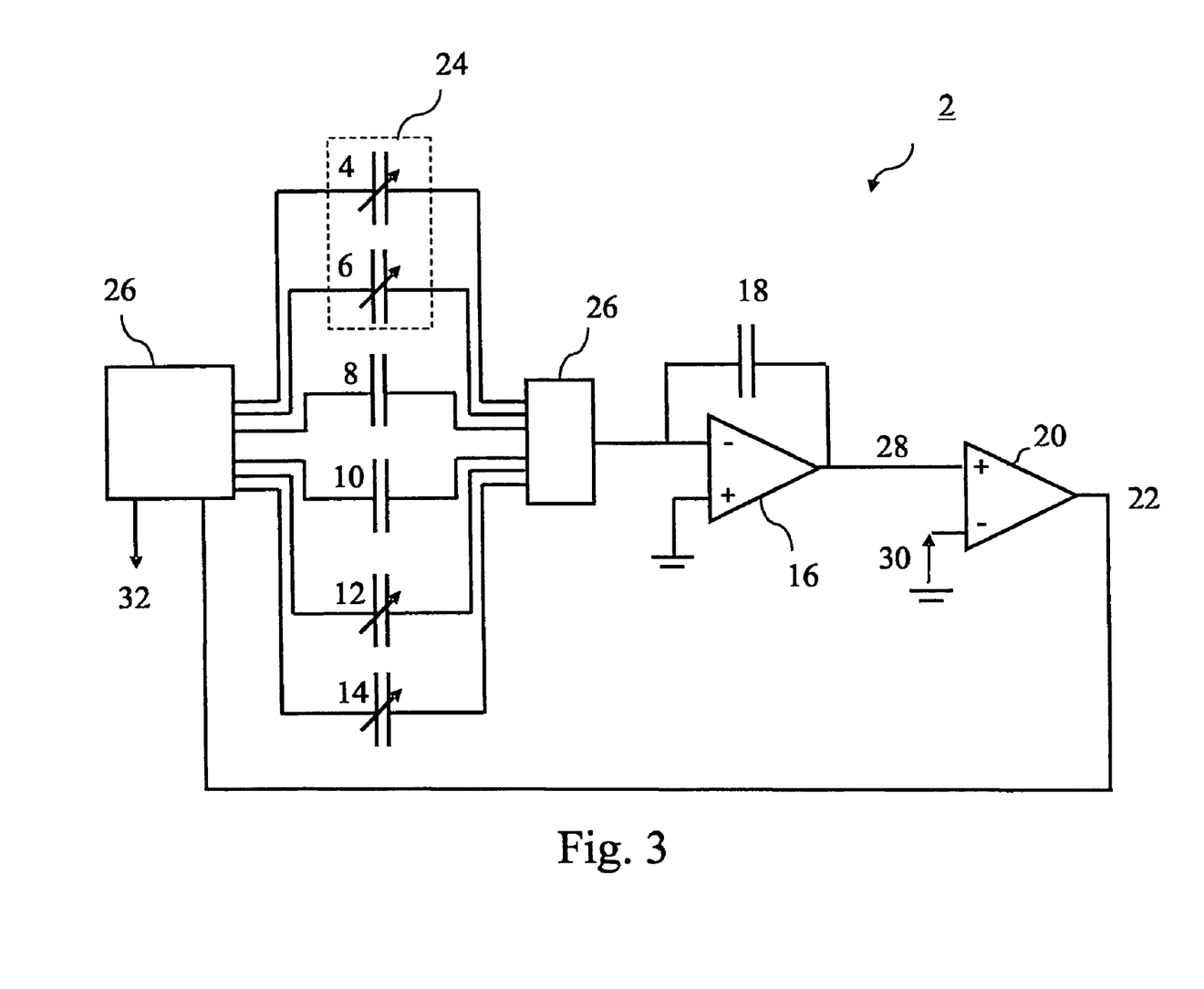

FIG. 3 shows a schematic view of a particular embodiment of the sensor 2 according to the invention in which the influence of the variations as a function of temperature of the dielectric constant of the materials of the support and the materials of the protected layers of the measurement 4 and reference 6 capacitors is taken into account.

The term "protective layer" should be understood to mean for example an insulator based on a polymer or lacquer, which may advantageously be used for various reasons, or any other layer obtained in particular by a surface treatment of the conductor, for example by controlled oxidation. One reason may in particular be to avoid a capillary effect of the liquid on the electrodes, since this capillary effect may introduce errors into the estimation by modifying (either increasing or decreasing) in contact with the surface, the actual height of the liquid level in the tank, especially in cases in which the implementation of the capacitor is of the type formed by imbricated combs on a flat substrate. As already mentioned, another reason may be to avoid short-circuits between the electrodes of the capacitor when electrically conducting impurities are inserted between them.

This protective layer degrades the precision of the measurement, but by taking this into account the precision is improved.

By generalization, the estimation of the liquid level 44 may be made by adding any number of additional compensating capacitors to the sensor 2 so as to take into account other parasitic capacitances, corresponding for example to the number of different media in the environment of the physical part of the sensor 2. The influence of the electrical connections may for example also be taken into account by such a compensation.

The control means 26 are capable of delivering on this basis a compensated estimation signal 32 for the reasons and according to the methods of implementation explained below.

The capacitance C of a capacitor is expressed in general as:

$$C = \Sigma_i \epsilon_i A_i,$$

in which each $\epsilon_i$ represents the dielectric constant of each material present close to the electrodes and in which:

$$A_i = \frac{S_i \epsilon_0}{e_i},$$

where $S_i$, $\epsilon_0$ and $e_i$ represent, respectively, the area of the electrodes, the dielectric constant of air or gas present above the liquid, and the depth corresponding to this insulator i.

According to the general electrostatic model and starting from Gauss' law, the relationship for the circulation of the electric field and the definition of capacitance, the capacitance of a capacitor formed by two conductors at potentials A and B and by n dielectrics is, by decomposition into subdomains within each of which the permittivity of the dielectric is uniform (for example domains consisting of a single dielectric), $$C = \frac{\left(\sum_{i=1}^{n} \int\int_{AB_i} \epsilon_i \vec{E}_i \cdot d\vec{S}_i\right)}{\int_A^B \vec{E} \cdot d\vec{S}}.$$

This general formulation may sometimes be simplified when the geometry of the capacitor formed by the conductors meets certain conditions.

For example, for two infinite flat capacitors of constant gap subjected to a uniform voltage difference (mounted in parallel), the capacitance C is given by:

$$C = \frac{\left(\sum_{i=1}^{n} \epsilon_i S_i\right)}{d_i} = \sum_{i=1}^{n} C_i.$$

For two cylindrical capacitors of infinite length in series, the capacitance is given by:

$$C_{equivalent}^{-1} = \left(\frac{1}{2\pi}\right) \cdot \sum_{i=1}^{n} \left\{\epsilon_i 1 / \left[\ln\left(\frac{R_{ei}}{R_{ii}}\right)\right]^{-1}\right\}$$

where $R_{ei}$ and $R_{ii}$ are the inside and outside radii of the capacitor i formed by the dielectric i.

More generally, any real capacitor can be decomposed into a number of elementary capacitors consisting of a uniform dielectric for which the capacitance is written as follows:

$$C = \frac{\epsilon_i \int\int_{AB_i} \vec{E}_i \cdot d\vec{S}_i}{\int_A^B \vec{E}_i \cdot d\vec{S}}$$

for any geometry of the plates. It is thus possible to express each of the integrations as a limited expansion of terms, the number of which may be adjusted according to the desired precision.

To a first approximation in the integrals, if for example the field E is relatively variable, then:

$$\int\int_{AB_i} \vec{E}_i \cdot d\vec{S}_i \sim E_i \cdot f(S) \text{ and } \int_A^B \vec{E}_i \cdot d\vec{s} \sim E_i g_i(d_i)$$

hence:

$$\frac{\left(\int\int_{AB_i} \vec{E}_i \cdot d\vec{S}_i\right)}{\int_A^B \vec{E}_i \cdot d\vec{s}} \sim \frac{f(S)}{g(d)} \sim G(S, 1/d)$$

and $$C_i = \epsilon_i G(S, 1/d).$$

Moreover, depending on the second model, when the real capacitor is recomposed from the various elementary capacitors, a representative circuit is obtained in which the elementary capacitors are arranged in series and/or in parallel. This type of problem can be solved using Kirchhoff's Laws, i.e. the mesh law for series-connected branches and the node law for parallel-connected branches.

Figure 5:
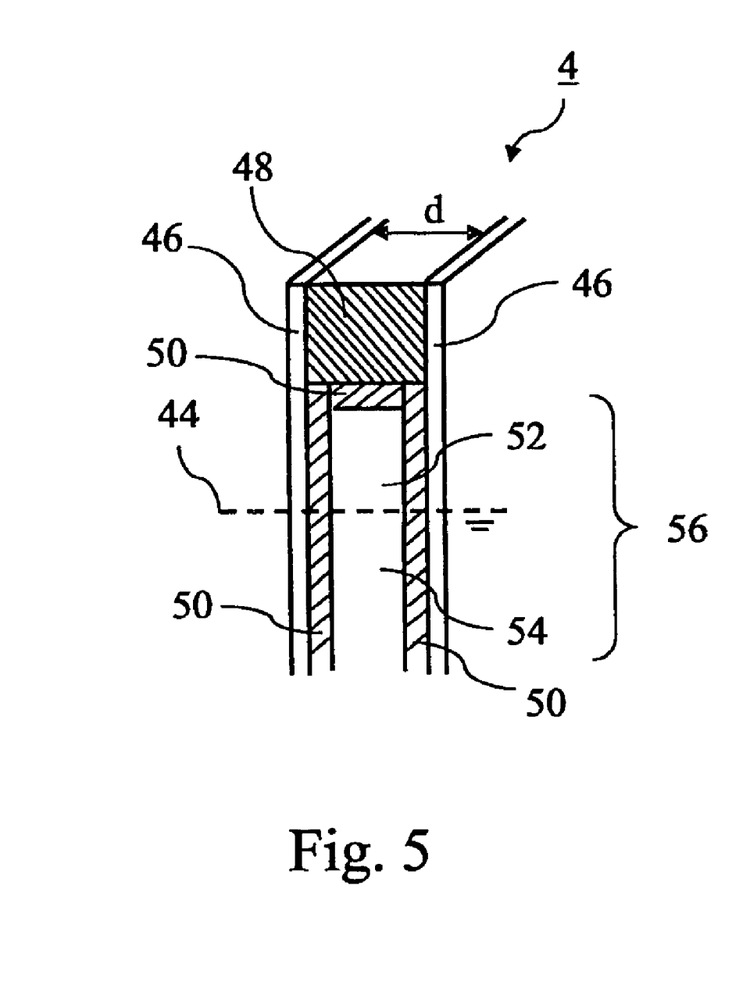
FIG. 5 shows a measurement capacitor used according to one particular embodiment of the sensor according to the invention.
Figure 6:
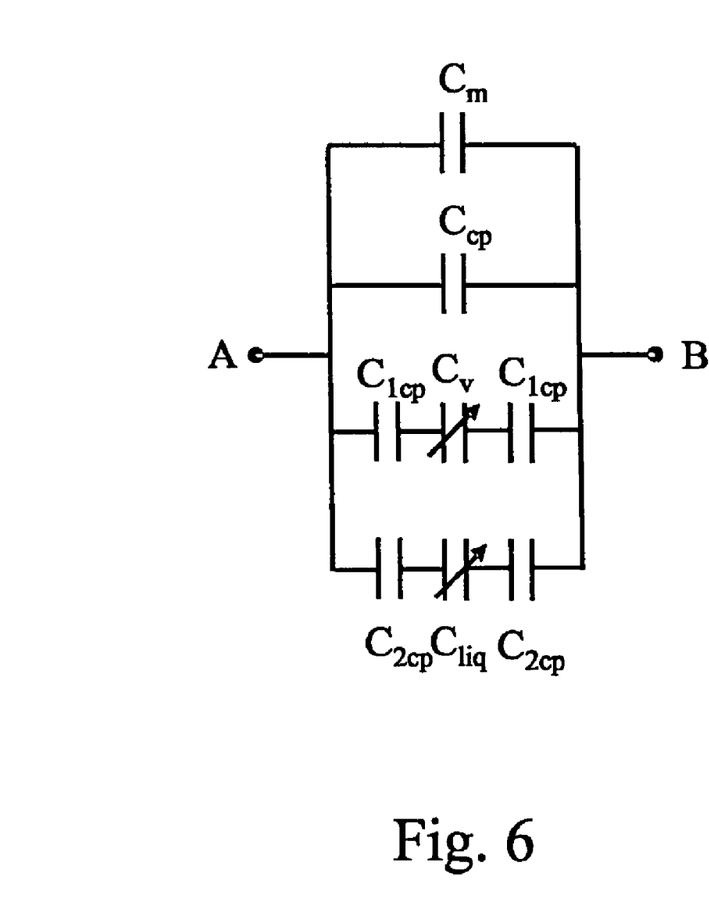
FIG. 6 shows an example of an equivalent circuit that can be used to design or program the control means according to the invention.

For example, and by way of illustration, FIG. 5 shows a measurement capacitor 4 used in one particular embodiment of the sensor 2 according to the invention and FIG. 6 shows an example of the equivalent circuit of the measurement capacitor 4 shown in FIG. 5. This equivalent circuit may be used to design and/or program the control means 26 according to the invention. The measurement capacitor 4 is represented in a simplified and schematic manner in FIG. 5, as is its circuit model or equivalent circuit shown in FIG. 6.

FIGS. 5 and 6 are explained in greater detail in what follows. FIG. 5 shows the two electrodes 46 of the measurement capacitor 4. They are separated by a distance d. A support material or substrate is placed in a region 48, called the region of the support material 48. This region covers an area $S_m$ (in cross section) and the material filling the region has a relative permittivity $\epsilon_m$. A protective layer is placed in the region 50, called the protective layer region 50. This region covers an area $S_{cp}$ and the material filling this region has a relative permittivity $\epsilon_{cp}$.

The region 56, called the variable-capacitance region 56, has a capacitance that varies with the liquid level 44 and an area $S_u$ shared in operation between gas and liquid depending on the liquid level 44. The variable-capacitance region 56 is separated into two parts, namely, on the one hand, the region 54 bathed by the liquid, of area:

$$S_u H$$

where H is the relative height, and of relative permittivity $\epsilon_r$, and, on the other hand, the region 52 bathed by the gas or air, of area:

$$S_u(1-H)$$

and of relative permittivity substantially equal to 1.

The capacitance of the measurement capacitor 4, that is to say the capacitance between the electrodes 46 shown in FIG. 5, or else the capacitance between the terminals A and B in the equivalent circuit shown in FIG. 6, may be calculated by decomposing the capacitor and its capacitance into four parts, corresponding to four capacitances in parallel, having the following values:

$$C_1 = C_m = \varepsilon_0 \varepsilon_m \frac{S_m}{d}$$

$$C_2 = C_{cp} = \varepsilon_0 \varepsilon_{cp} \frac{S_{cp}}{d}$$

$$C_3 = \left(\frac{1}{C_{1cp}} + \frac{1}{C_v} + \frac{1}{C_{1cp}}\right)^{-1} = \varepsilon_0 S_u (1-H) \left(\frac{2e}{\varepsilon_{cp}} + (d-2e)\right)^{-1}$$

$$C_4 = \varepsilon_0 S_u H \left(\frac{2e}{\varepsilon_{cp}} + \frac{d-2e}{\varepsilon_r}\right).$$

Thus, by addition, a mathematical expression for the capacitance $C_{12}$ of the measurement capacitor 4 is obtained, namely:

$$C_{12} = \varepsilon_0 \cdot \left\{ \begin{array}{l} \left(\varepsilon_m \frac{S_m}{d}\right) + \left(\varepsilon_{cp} \frac{S_{cp}}{d}\right) + \\ S_u(1-H)\left(\frac{2e}{\varepsilon_{cp}} + (d-2e)\right)^{-1} + \\ S_u H\left(\frac{2e}{\varepsilon_{cp}} + \frac{d-2e}{\varepsilon_r}\right)^{-1} \end{array} \right\}.$$

The equation that links the relative height H of liquid to the capacitance $C_{12}$ of the measurement capacitor 4 depends on the state of the liquid via $\epsilon_r$, and also on two other parameters $\epsilon_m$ and $\epsilon_{cp}$ resulting from the practical construction of the sensor 2 via the materials used. Similarly, the capacitance $C_{11}$ of the reference capacitor 6 is expressed, by adding the "r" suffixes, as:

$$C_{11} = \varepsilon_0 \left\{ \begin{array}{l} \left(\varepsilon_m \frac{S_{mr}}{d}\right) + \left(\varepsilon_{cp} \frac{S_{cpr}}{d}\right) + \\ S_{ur}\left(\frac{2e}{\varepsilon_{cp}} + \frac{d-2e}{\varepsilon_r}\right)^{-1} \end{array} \right\}.$$

By judiciously placing the plates, or by any other means, the first compensating capacitor 12 is produced and added to the environment of the measurement capacitor 4 and the reference capacitor 6. This first compensating capacitor 12, thanks to the properties of its dielectric and to its shape, imitates, possibly via a proportionality factor or an association function pre-established by prior measurement, for example the change with temperature of the capacitance $C_1$, and simulates the capacitors with the same thicknesses and identical materials resulting from identical manufacturing processes. The capacitance measured across the terminals of the first compensating capacitor 12 is given substantially by:

$$C_1' \sim \varepsilon_0 \varepsilon_m \frac{S_m}{d}. \quad \text{(equation 1)}$$

Likewise, the capacitance measured across the terminals of the second compensating capacitor 14 is given substantially by:

$$C_2' \sim \varepsilon_0 \varepsilon_{cp} \frac{S_{cp}}{d}. \quad \text{(equation 2)}$$

Finally, knowing, by prior measurement, that the capacitances of the measurement 4 and reference 6 capacitors, when the tank 24 is completely empty, are substantially equal, respectively, to:

$$C_{120} = \varepsilon_0 \left\{ \begin{array}{l} \left(\varepsilon_m \frac{S_m}{d}\right) + \left(\varepsilon_{cp} \frac{S_{cp}}{d}\right) + \\ S_u\left(\frac{2e}{\varepsilon_{cp}} + (d-2e)\right)^{-1} \end{array} \right\}$$

$$C_{110} = \varepsilon_0 \left\{ \begin{array}{l} \left(\varepsilon_m \frac{S_{mr}}{d}\right) + \left(\varepsilon_{cp} \frac{S_{cpr}}{d}\right) + \\ S_{ur}\left(\frac{2e}{\varepsilon_{cp}} + (d-2e)\right)^{-1} \end{array} \right\},$$

the following expressions are obtained:

$$C_{12} - C_{120} = \varepsilon_0 S_u H \left\{ \begin{array}{l} \left(\frac{2e}{\varepsilon_{cp}} + \frac{(d-2e)}{\varepsilon_r}\right)^{-1} - \\ \left(\frac{2e}{\varepsilon_{cp}} + (d-2e)\right)^{-1} \end{array} \right\}, \quad \text{(equation 3)}$$

and $$C_{11} - C_{110} = \varepsilon_0 S_{ur} \left\{ \begin{array}{l} \left(\frac{2e}{\varepsilon_{cp}} + \frac{(d-2e)}{\varepsilon_r}\right)^{-1} - \\ \left(\frac{2e}{\varepsilon_{cp}} + (d-2e)\right)^{-1} \end{array} \right\}. \quad \text{(equation 4)}$$

Thus, a system of four linear equations (equations 1 to 4) in four unknowns, namely H, $\epsilon_{cp}$, $\epsilon_r$ and $\epsilon_m$, is obtained, the methods for solving them being well known. These equations may advantageously be integrated into the control means 26.

This reasoning may be generalized, since capacitors of any shape may be modelled by superposing the effect of the various domains characterized by a single dielectric using the following general formula:

$$C_i = \epsilon_i G(S, 1/d),$$

i.e. a linear dependence of the capacitance of this capacitor with the permittivity of the medium.

By measuring the various judiciously chosen capacitances it is therefore possible to have a solvable system of linear equations. By solving this system it is therefore possible to calculate a precise estimation of the height of the liquid independently of the characteristics of the constituent dielectrics of the level sensor, irrespective of their number.

In one particular embodiment of the sensor 2 according to the invention, the sensor 2 includes an electronic circuit placed in the top part of the sensor 2, so as to implement in particular the control means 26, and further includes a connection track for connecting the reference capacitor 6 to the electronic circuit. Moreover, in this embodiment, the influence of the parasitic capacitance caused by the presence of the connection track is taken into account for estimating the liquid level 44.

This connection track is formed by a track or a cable placed along the measurement capacitor 4, which extends over the entire height of this capacitor and allows the measured value of the capacitance of the reference capacitor 6 to be transmitted to the circuit. The connection track acts as an additional capacitance which is added to the capacitance of the reference capacitor 6. This parasitic capacitance varies with the liquid level 44 since the track is placed in the variable-capacitance region 56.

By similar reasoning to that developed above, an equivalent circuit comprising three capacitances in series may be developed for analysing the influence of the connection track on the measured capacitance of the reference capacitor 6 and to compensate for its presence in the control means 26. It will be clear to those skilled in the art, in view of the foregoing, that the relative liquid level 44 may be estimated by a function of several capacitances corresponding in particular to the influence of the physical implementation of the sensor 2 and of the dielectric constants of the materials, by the addition of a compensating capacitor for each of the unknowns added, corresponding to the various dielectrics present in the structure of the physical part of the sensor 2 or neighbouring the latter and appearing in the equation(s) to be solved.

This sensor 2 allows the precision in estimating the liquid level 44 to be improved.

In one embodiment of the sensor 2 according to the invention, the influence of the dielectrics or of certain structural dielectrics is not compensated for by the addition of compensating capacitors, but is taken into account by a prior calibration.

In one embodiment of the sensor 2 according to the invention, the calibration capacitor 8, acting as discharge capacitor during an accumulation period and being associated with a target capacitor, the capacitance of which is a priori unknown, is automatically selected beforehand according to an initial measurement of the dielectric constant of the liquid, by means of the reference capacitor 6. This improves the precision of the measured capacitance of the target capacitor, for example the measurement capacitor 4.

In one embodiment of the sensor 2 according to the invention, the reference capacitor 6 is used to measure the level 44 of the liquid over the very height of the latter.

Conventionally, the purpose of the reference capacitor 6 is to measure the variations in dielectric constant of the liquid present in the tank 24 as a function of temperature and of the composition of the liquid. The very presence of this reference capacitor 6 prevents the liquid level 44 from being measured when this level is very low. However, it is possible to obtain a value of the liquid level 44, admittedly with lower precision, by storing in memory the "empty" capacitance when first filling the tank 24.

In one embodiment of the sensor 2 according to the invention, the control means 26 operate differently when the tank 24 is being filled and when the liquid is dropping in the tank 24. In motor vehicle applications in particular, and when for example the tank 24 is a fuel tank, the change in liquid level 44 is much slower as the level 44 drops than when the tank 24 is being filled. An adaptation of the succession of accumulation periods and their duration as a function of the type of process examined—a drop or a rise in the liquid level 44—may advantageously be integrated into and implemented in the control means 26.

In one embodiment of the sensor 2 according to the invention, the control means 26 are produced in electronic form and the corresponding electronic part is placed inside the tank 24, either in the liquid phase or the vapour phase, in the immediate vicinity of the plates of the reference 6 and the measurement 4 capacitors. This makes it possible to reduce the parasitic capacitances due to the length of the connections between the plates and the electronic circuit, to reduce the influence of temperature, to produce a single printed circuit, in the case of implementation using printed circuits for producing the control means 26 and the measurement 4 and reference 6 capacitors in the tank 24, and to simplify the manufacture, while reducing the costs.

It will be clear to a person skilled in the art that the sensor 2 according to the invention may be used for example for a tank 24 in a vehicle, for example a motor vehicle, and that the liquid may for example be fuel, whether diesel, petrol or liquefied petroleum gas.

Within the context of the invention, the expression "placed in the tank 24" means both in the tank 24 but also on the tank 24 insofar as the capacitances of the capacitors involved are influenced, significantly and measurably, by the dielectric changes inside the tank 24.

The expression "placed in a bottom part of the tank 24" means placed sufficiently low down in the latter so as to be capable of generally delivering a reference measurement not dependent on the level 44, except possibly due to the connection effects, and preferably always immersed in operation. The reference capacitor 6 may for example also be placed in the discharge line of the tank 24.

Again within the context of the invention, the expression "capacitance higher than that of the measurement capacitor 4" means higher than the capacitance of the measurement capacitor 4 under normal conditions of use, that is to say when the liquid has for example a dielectric constant between 1 and 80, or about 80.

It will be clear to a person skilled in the art that the control means 26 may in particular be electrical, electronic or computing means, produced for example in the form of one or more electronic circuits or one or more microprocessors.

It will also be clear to a person skilled in the art that the estimation signal 32 corresponding to the liquid level 44 may either be an analogue signal or a digital signal without departing from the principle of the invention. If the control means 26 are produced in the form of an electronic circuit which is placed in the tank 24, either an analogue signal largely insensitive to external interference or a digital signal is preferred according to one embodiment of the invention for transmitting the estimation signal corresponding to the level in the tank.

It will be clear to a person skilled in the art that the operational amplifier 16 and the comparator 20 may be of any type, irrespective of their construction, their quality, their input and output impedances or their ideality.

The charge transfer may for example be implemented by a switched-capacitance system having non-overlapping cycles in order to avoid any short-circuits and other nuisances, as explained above.

The duration of the accumulation periods may be for example 600 milliseconds. In general, the longer the period, the more precise the measurement. However, as it is often necessary to obtain a measurement sufficiently regularly, to some extent limiting the duration of the accumulation periods is unavoidable.

The duration of the transient period before coming to steady state, and consisting in charging the integrating capacitor 18 from a zero value up to the threshold voltage 30, may vary according to the capacitance of the target capacitor and according to the capacitance of the integrating capacitor 18. This duration may for example be 50 to 200 microseconds. The threshold voltage 30 itself may for example be 2.5 volts.

In one particular mode of implementing the method according to the invention, a warning signal is delivered when an atypical level 44 is estimated, so that for example the presence of an undesirable liquid, such as water, in the tank 24 can be communicated to the vehicle control systems.

The present invention is not limited by what has in particular been illustrated in the drawings and by what has in particular been described above.

The invention claimed is:

1. A capacitive sensor for detecting a level of a liquid in a tank, comprising:
    a measurement capacitor configured to be placed in the tank;
    a reference capacitor configured to be placed in a bottom part of the tank;
    a calibration capacitor, having a capacitance higher than that of the measurement capacitor;
    a controller for delivering an estimation signal corresponding to the level of the liquid, the estimation signal being based on capacitance values of the measurement capacitor, the reference capacitor, and the calibration capacitor;
    an operational amplifier with an inverting input;
    an integrating capacitor connected between the inverting input of the amplifier and an output of the operational amplifier;
    a comparator configured to compare an output voltage of the amplifier with a threshold voltage and to deliver a comparison signal to the controller; and
    a complementary calibration capacitor having a capacitance higher than that of the reference capacitor and different from that of the calibration capacitor;
    wherein the controller is configured to implement, over successive accumulation periods and for a target capacitor and a discharge capacitor that are given for each period:
        charging the target capacitor by applying a given voltage to its terminals;
        transferring charge from the target capacitor to the integrating capacitor;
        deciding to skip a next discharging if the comparison signal is negative;
        discharging some of the charge of the integrating capacitor into the discharge capacitor and then completely discharging the discharge capacitor; and
        returning to the charging;
    and wherein the target and discharge capacitors given at each period are taken respectively from a group of pairs of capacitors, including:
        the measurement capacitor and the calibration capacitor; and
        the reference capacitor and the complementary calibration capacitor.

2. The sensor according to claim 1, wherein the complementary calibration capacitor has a capacitance lower than that of the calibration capacitor.

3. The sensor according to claim 1, wherein the controller selects the calibration capacitor, automatically, from among the various capacitors, prior to an accumulation period associated with the measurement capacitor according to an initial measurement of dielectric constant of the liquid made on the reference capacitor.

4. The sensor according to claim 1, wherein the controller is in an electronic circuit placed inside the tank.

5. The sensor according to claim 1, further comprising a first compensating capacitor, characteristics of which vary with temperature substantially in a same way as materials of support for the measurement capacitor and reference capacitors; and wherein a group of pairs of capacitors further includes the first compensating capacitor and an associated first discharge capacitor.

6. The sensor according to claim 5, wherein the associated first discharge capacitor is the complementary calibration capacitor.

7. The sensor according to claim 1, further comprising a second compensating capacitor, characteristics of which vary with temperature substantially in a same manner as materials of protective layers of the measurement capacitor and reference capacitors, respectively; and wherein a group of pairs of capacitors further includes the second compensating capacitor and an associated second discharge capacitor.

8. The sensor according to claim 7, wherein the associated second discharge capacitor is the complementary calibration capacitor.

9. A use of a sensor according to claim 1 in a tank.

10. A method of estimating a level of a liquid in a tank by a capacitive measurement that, over successive accumulation periods and for a target capacitor and a discharge capacitor, the method comprising:
    charging the target capacitor by applying a given voltage to its terminals;
    transferring the charge from the target capacitor to an integrating capacitor, connected between an inverting input of an operational amplifier and an output of the operational amplifier;
    deciding to skip a next discharging if a comparison signal is negative, the comparison signal being delivered by a comparator configured to compare an output voltage of the amplifier with a threshold voltage;
    discharging some of the charge of the integrating capacitor into the discharge capacitor and then completely discharging the discharge capacitor;
    returning to the charging;
    the target and discharge capacitors at each operation being taken respectively from a group of pairs of capacitors, including:
    a measurement capacitor configured to be placed in the tank, and a calibration capacitor having a capacitance higher than that of the measurement capacitor; and
    a reference capacitor configured to be placed in a bottom part of the tank, and a complementary calibration capacitor having a capacitance higher than that of the reference capacitor and different from that of the calibration capacitor; and
    estimating the level of the liquid in the tank with a controller based on capacitance values of the measurement capacitor, the reference capacitor, and the calibration capacitor.

11. The method according to claim 10, further comprising delivering a warning signal when an atypical level is estimated.

* * * * *